US012537153B2

(12) United States Patent
Fujiwara et al.

(10) Patent No.: US 12,537,153 B2
(45) Date of Patent: Jan. 27, 2026

(54) ELECTRICAL CIRCUIT CIRCUIT-BREAKING DEVICE

(71) Applicant: DAICEL CORPORATION, Osaka (JP)

(72) Inventors: Tomohide Fujiwara, Tokyo (JP); Katsuya Tone, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 252 days.

(21) Appl. No.: 18/271,254

(22) PCT Filed: Jan. 7, 2022

(86) PCT No.: PCT/JP2022/000321
§ 371 (c)(1),
(2) Date: Jul. 7, 2023

(87) PCT Pub. No.: WO2022/149608
PCT Pub. Date: Jul. 14, 2022

(65) Prior Publication Data
US 2024/0071701 A1 Feb. 29, 2024

(30) Foreign Application Priority Data
Jan. 8, 2021 (JP) ................................. 2021-002335

(51) Int. Cl.
*H01H 9/30* (2006.01)
*H01H 39/00* (2006.01)

(52) U.S. Cl.
CPC ............ *H01H 39/006* (2013.01); *H01H 9/30* (2013.01); *H01H 2039/008* (2013.01)

(58) Field of Classification Search
CPC ............ H01H 9/302; H01H 9/30; H01H 9/36; H01H 9/52; H01H 33/04; H01H 39/006;
(Continued)

(56) References Cited

U.S. PATENT DOCUMENTS 3,848,100 A * 11/1974 Kozorezov .......... H01H 39/006 200/61.08
5,783,987 A * 7/1998 Kern ...................... H01H 39/00 337/403
(Continued)

FOREIGN PATENT DOCUMENTS

CN 210403648 * 4/2020 ............. H01H 85/38
EP 4 040 461 A1 8/2022
(Continued)

OTHER PUBLICATIONS

Translation of CN210403648(Original document published Apr. 24, 2020) (Year: 2020).*
(Continued)

*Primary Examiner* — William A Bolton
(74) *Attorney, Agent, or Firm* — Birch, Stewart, Kolasch & Birch, LLP

(57) ABSTRACT

An electric circuit breaker device includes: an igniter provided to a housing; a projectile disposed in an accommodating space formed in the housing, the projectile being configured to be projected along the accommodating space by energy received from the igniter; a conductor piece forming a portion of an electric circuit, and includes a cutoff portion crossing the accommodating space and configured to be cut off by the projectile that moves by the energy received from the igniter; a coolant material disposed in an arc-extinguishing region and positioned within the accommodating space while opposing the projectile prior to actuation of the igniter with the cutoff portion interposed between the arc-extinguishing region and the projectile, and configured to receive the cutoff portion cut off by the projectile; and a resin material disposed in the accommodating space and configured to be modified by heat associated with actuation of the igniter.

7 Claims, 10 Drawing Sheets

(58) Field of Classification Search
CPC .... H01H 39/002; H01H 39/004; H01H 39/00; H01H 2039/008; H01H 50/02; H01H 50/546; H02H 3/08
USPC ........ 218/154, 153, 140, 120, 95; 200/61.08
See application file for complete search history.

(56) References Cited

U.S. PATENT DOCUMENTS

| | | | | |
|---|---|---|---|---|
| 8,957,335 | B2 | 2/2015 | Sprenger et al. | |
| 9,418,807 | B2 * | 8/2016 | Marlin | H01H 1/365 |
| 10,211,014 | B2 * | 2/2019 | Kim | H01H 85/0241 |
| 10,236,148 | B2 * | 3/2019 | Lell | H01H 3/28 |
| 10,424,448 | B2 * | 9/2019 | Goldman | H01H 9/342 |
| 2013/0220095 | A1 | 8/2013 | Ukon et al. | |
| 2013/0255464 | A1 | 10/2013 | Ukon et al. | |
| 2020/0066465 | A1 | 2/2020 | Moszynski et al. | |
| 2020/0203102 | A1 * | 6/2020 | Sakai | H01H 39/006 |
| 2023/0290596 | A1 | 9/2023 | Gaudinat | |

FOREIGN PATENT DOCUMENTS

| | | | |
|---|---|---|---|
| JP | 2009-295419 | A | 12/2009 |
| JP | 2010-102936 | A | 5/2010 |
| JP | 2020-161468 | A | 10/2020 |
| WO | WO 2020/093079 | A1 | 5/2020 |
| WO | WO 2020/158693 | A1 | 8/2020 |
| WO | WO 2022/017841 | A1 | 1/2022 |

OTHER PUBLICATIONS

Extended European Search Report for European Application No. 22736776.0, dated Oct. 15, 2024.

International Search Report for International Application No. PCT/JP2022/000321, dated Feb. 8, 2022, with English translation.

Written Opinion of the International Searching Authority for International Application No. PCT/JP2022/000321, dated Feb. 8, 2022, with English translation.

* cited by examiner

ELECTRICAL CIRCUIT CIRCUIT-BREAKING DEVICE

TECHNICAL FIELD

The present invention relates to an electric circuit breaker device (an electrical circuit circuit-breaking device).

BACKGROUND ART

An electric circuit may be provided with a breaker device configured to be actuated when an abnormality occurs in a device constituting the electric circuit or when an abnormality occurs in a system in which the electric circuit is mounted, thereby urgently interrupting the continuity of the electric circuit. Electric circuit breaker devices have been proposed in which, according to one aspect thereof, a projectile is moved at high speed by energy applied from an igniter or the like to forcibly and physically cut a conductor piece that forms a portion of an electric circuit (refer to Patent Documents 1 and 2 and the like, for example). Further, in recent years, electric circuit breaker devices applied to electric vehicles equipped with a high-voltage power source are becoming increasingly important.

CITATION LIST

Patent Literature

Patent Document 1: WO 2020/093079
Patent Document 2: U.S. Pat. No. 8,957,335

SUMMARY OF INVENTION

Technical Problem

In an electric circuit breaker device, failing to appropriately extinguish arc discharge during actuation may cause damage to a device to which the electric circuit breaker device is connected. Therefore, a technique for effectively extinguishing an arc is desired. Further, it is desirable to ensure a sufficient insulation resistance value after cutting.

The technique of the present disclosure has been made in view of the circumstances described above, and an object thereof is to provide an electric circuit breaker device that can quickly extinguish an arc during actuation and prevents reduction in an insulation resistance value.

Solution to Problem

To solve the problems described above, an electric circuit breaker device of the present disclosure includes: an igniter provided to a housing; a projectile disposed in an accommodating space, the accommodating space being formed in the housing and extending in one direction, the projectile being to be projected along the accommodating space by energy received from the igniter; a conductor piece that is provided to the housing, forms a portion of an electric circuit, includes in a portion thereof a cutoff portion to be cut off by the projectile that moves by the energy received from the igniter, and is disposed with the cutoff portion crossing the accommodating space; a coolant material disposed in an arc-extinguishing region, the arc-extinguishing region being positioned within the accommodating space, on a side opposite to the projectile prior to actuation of the igniter with the cutoff portion interposed between the arc-extinguishing region and the projectile, and configured to receive the cutoff portion cut off by the projectile; and a resin material that is disposed in the accommodating space and that is to be modified by heat associated with actuation of the igniter.

In the electric circuit breaker device, the resin material may be disposed between the cutoff portion and the coolant material.

In the electric circuit breaker device, the projectile may include a piston portion configured to receive energy from actuation of the igniter and move along the accommodating space, and the resin material may be disposed on the arc-extinguishing region side of the piston portion prior to actuation of the igniter.

In the electric circuit breaker device, the projectile may include a rod portion extending from a surface on the arc-extinguishing region side of the piston portion to a side of the cutoff portion of the conductor piece, and the resin material may be disposed between the piston portion and the cutoff portion, and between an inner wall of the housing forming the accommodating space and the rod prior to actuation of the igniter.

In the electric circuit breaker device, the resin material may be formed in a ring shape or an arc shape along an inner wall surface of the housing.

In the electric circuit breaker device, the coolant material may be formed from metal fibers, and the resin material may be impregnated between the metal fibers forming the coolant material.

In the electric circuit breaker device, the resin material may be a synthetic resin including silicone.

Advantageous Effects of Invention

According to the present disclosure, it is possible to provide an electric circuit breaker device that can effectively extinguish an arc generated during actuation and prevents reduction in an insulation resistance value.

DESCRIPTION OF EMBODIMENTS

Configuration

Figure 1:
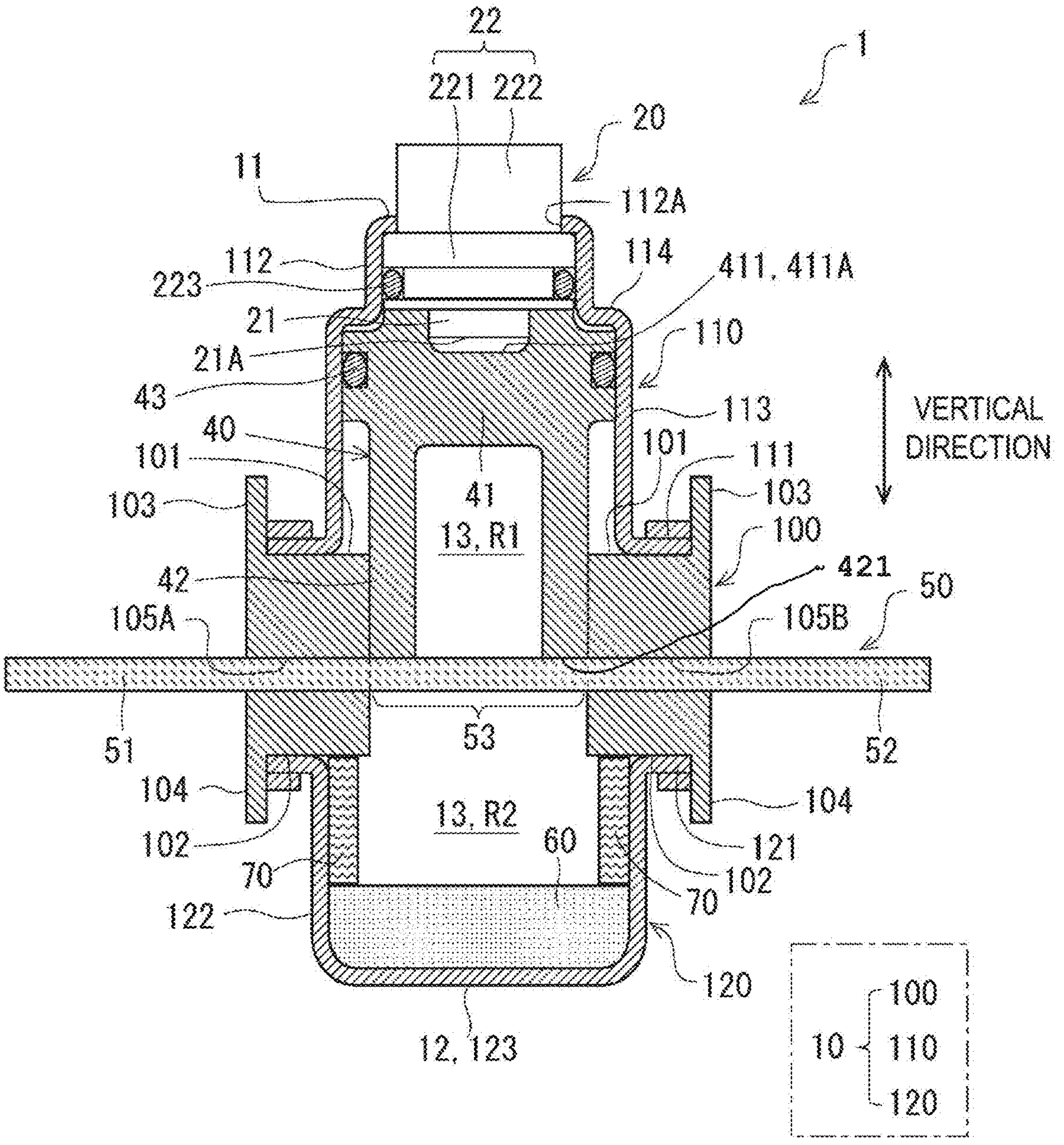
FIG. 1 is a view illustrating an internal structure of an electric circuit breaker device (hereinafter simply referred to as the "breaker device") according to an embodiment.

FIG. 1 is a view illustrating an internal structure of an electric circuit breaker device (hereinafter simply referred to as the "breaker device") 1 according to an embodiment. The breaker device 1 is a device configured to interrupt an electric circuit included in a vehicle, an electric home appliance, a photovoltaic system, or the like when an abnormality occurs in the electric circuit or in a system including a lithium battery (lithium ion battery, for example) of the electric circuit, thereby preventing great damage. In the present specification, a cross section in the height direction illustrated in FIG. 1 (direction in which an accommodating space 13 described later extends) is referred to as a vertical cross section of the breaker device 1, and a cross section in a direction orthogonal to the height direction is referred to as a transverse cross section of the breaker device 1. FIG. 1 illustrates a state prior to actuation of the breaker device 1.

The breaker device 1 includes a housing 10 as an outer shell member, an igniter 20, a projectile 40, a conductor piece 50, a coolant material 60, and a resin material 70. The housing 10 includes the accommodating space 13 that extends in a direction from a first end portion 11 on an upper end side to a second end portion 12 on a lower end side. This accommodating space 13 is a space formed in a straight line, making the projectile 40 movable, and extends along a vertical direction of the breaker device 1. As illustrated in FIG. 1, the accommodating space 13 formed inside the housing 10 accommodates the projectile 40. However, in the present specification, the vertical direction of the breaker device 1 merely indicates a relative positional relationship among the elements in the breaker device 1 for convenience of description of the embodiment.

Housing

The housing 10 includes a housing body 100, a top holder 110, and a bottom container 120. The housing body 100 is bonded to the top holder 110 and the bottom container 120, thereby forming the housing 10 that is integral.

The housing body 100 has, for example, a substantially prismatic outer shape. However, the shape of the housing body 100 is not particularly limited. The housing body 100 includes a cavity portion formed therethrough along the vertical direction. This cavity portion forms a portion of the accommodating space 13. Furthermore, the housing body 100 includes an upper surface 101 to which a flange portion 111 of the top holder 110 is fixed and a lower surface 102 to which a flange portion 121 of the bottom container 120 is fixed. In the present embodiment, an upper tubular wall 103 having a tubular shape is provided erected upward from the upper surface 101 on the outer circumferential side of the upper surface 101 in the housing body 100. In the present embodiment, the upper tubular wall 103 has a rectangular tubular shape, for example, but may have other shapes. On the outer circumferential side of the lower surface 102 in the housing body 100, a lower tubular wall 104 having a tubular shape is provided suspended downward from the lower surface 102. In the present embodiment, the lower tubular wall 104 has a rectangular tubular shape, for example, but may have other shapes. The housing body 100 configured as described above can be formed from an insulating member such as a synthetic resin, for example. For example, the housing body 100 may be formed from nylon, which is a type of polyamide synthetic resin.

Top Holder

Next, the top holder 110 will be described. The top holder 110 is, for example, a cylindrical member having a stepped cylindrical tubular shape with a hollow inside. The top holder 110 includes a small diameter cylinder portion 112 positioned on the upper side (first end portion 11 side), a large diameter cylinder portion 113 positioned on the lower side, a connection portion 114 connecting these, and the flange portion 111 extending outward from a lower end of the large diameter cylinder portion 113. For example, the small diameter cylinder portion 112 and the large diameter cylinder portion 113 are coaxially disposed, and the large diameter cylinder portion 113 has a diameter slightly larger than that of the small diameter cylinder portion 112.

The contour of the flange portion 111 in the top holder 110 has a substantially quadrangular shape that fits inside the upper tubular wall 103 in the housing body 100. For example, the flange portion 111 may be integrally fastened to the upper surface 101 in the housing body 100 using a screw or the like, or may be fixed thereto by a rivet or the like, in a state of being disposed inside the upper tubular wall 103. Further, the top holder 110 may be bonded to the housing body 100 in a state where a sealant is applied between the upper surface 101 of the housing body 100 and a lower surface of the flange portion 111 in the top holder 110. This can increase airtightness of the accommodating space 13 formed in the housing 10. Further, instead of the sealant or in combination with the sealant, an O-ring may be interposed between the upper surface 101 of the housing body 100 and the flange portion 111 of the top holder 110 to increase the airtightness of the accommodating space 13.

The cavity portion formed inside the small diameter cylinder portion 112 in the top holder 110 functions as an accommodating space for accommodating a portion of the igniter 20 as illustrated in FIG. 1. Further, the cavity portion formed inside the large diameter cylinder portion 113 in the top holder 110 communicates with the cavity portion of the housing body 100 positioned below, and forms a portion of the accommodating space 13. The top holder 110 configured as described above can be formed from an appropriate metal member, such as stainless steel or aluminum, having excellent strength and durability, for example. However, a material for forming the top holder 110 is not particularly limited. Also, for the shape of the top holder 110, the above aspect is an example and other shapes may be adopted.

Bottom Container

Next, the bottom container 120 will be described. The bottom container 120 has a substantially tubular bottomed shape with a hollow inside, and includes a side wall portion 122, a bottom wall portion 123 connected to a lower end of the side wall portion 122, and a flange portion 121 connected to an upper end of the side wall portion 122. The side wall portion 122 has, for example, a cylindrical tubular shape. The flange portion 121 extends outward from the upper end of the side wall portion 122. The contour of the flange portion 121 in the bottom container 120 has a substantially quadrangular shape that fits inside the lower tubular wall 104 in the housing body 100. For example, the flange portion 121 may be integrally fastened to the lower surface 102 in the housing body 100 using a screw or the like, or may be fixed thereto by a rivet or the like, in a state of being disposed inside the lower tubular wall 104. Here, the bottom container 120 may be bonded to the housing body 100 in a state where the sealant is applied between the lower surface 102 of the housing body 100 and an upper surface of the flange portion 121 in the bottom container 120. This can increase airtightness of the accommodating space 13 formed in the housing 10. Further, instead of the sealant or in combination with the sealant, an O-ring may be interposed between the lower surface 102 of the housing body 100 and the flange portion 121 of the bottom container 120 to increase the airtightness of the accommodating space 13.

Note that the above aspect regarding the shape of the bottom container 120 is an example, and other shapes may be adopted. Further, the cavity portion formed inside the bottom container 120 communicates with the housing body 100 positioned above, and forms a portion of the accommodating space 13. The bottom container 120 configured as described above can be formed from an appropriate metal member, such as stainless steel or aluminum, having excellent strength and durability, for example. However, a material for forming the bottom container 120 is not particularly limited. Further, the bottom container 120 may have a multilayer structure. For example, in the bottom container 120, an exterior portion facing the outside may be formed from an appropriate metal member, such as stainless steel or aluminum, having excellent strength and durability, and an interior portion facing the accommodating space 13 may be formed from an insulating member such as a synthetic resin. Of course, the entire bottom container 120 may be formed from an insulating member.

As described above, the housing 10 in the embodiment includes the housing body 100, the top holder 110, and the bottom container 120 that are integrally assembled, and the accommodating space 13 extending in the direction from the first end portion 11 to the second end portion 12 is formed inside the housing 10. The accommodating space 13 accommodates the igniter 20, the projectile 40, a cutoff portion 53 in the conductor piece 50, the coolant material 60, and the resin material 70 that are described below in detail.

Igniter

Next, the igniter 20 will be described. The igniter 20 is an electric igniter that includes an ignition portion 21 with an ignition charge, and an igniter body 22 including a pair of conduction pins (not illustrated) connected to the ignition portion 21. The igniter body 22 is surrounded by an insulating resin, for example. Further, tip end sides of the pair of conduction pins in the igniter body 22 are exposed to the outside, and are connected to a power source when the breaker device 1 is used.

The igniter body 22 includes a body portion 221 having a substantially cylindrical shape and accommodated inside the small diameter cylinder portion 112 in the top holder 110, and a connector portion 222 positioned on the body portion 221. The igniter body 22 is fixed to the small diameter cylinder portion 112 by, for example, the body portion 221 being pressed to an inner circumferential surface of the small diameter cylinder portion 112. Further, a constricted portion having an outer circumferential surface recessed as compared with other locations is annularly formed along a circumferential direction of the body portion 221 at an axially intermediate portion of the body portion 221. An O-ring 223 is fitted into this constricted portion. The O-ring 223 is formed from, for example, rubber (silicone rubber, for example) or a synthetic resin, and functions to increase airtightness between the inner circumferential surface in the small diameter cylinder portion 112 and the body portion 221.

The connector portion 222 in the igniter 20 is disposed protruding to the outside through an opening 112A formed at an upper end of the small diameter cylinder portion 112. The connector portion 222 has, for example, a cylindrical tubular shape covering a side of the conduction pin, allowing connection with a connector of a power source.

As illustrated in FIG. 1, the ignition portion 21 of the igniter 20 is disposed facing the accommodating space 13 (more specifically, the cavity portion formed inside the large diameter cylinder portion 113) of the housing 10. The ignition portion 21 is configured as a form accommodating an ignition charge in an igniter cup, for example. For example, the ignition charge is accommodated in the igniter cup in the ignition portion 21 in a state of being in contact with a bridge wire (resistor) suspended coupling the base ends of the pair of conduction pins to each other. As the ignition charge, for example, zirconium-potassium perchlorate (ZPP), zirconium-tungsten-potassium perchlorate (ZWPP), titanium hydride-potassium perchlorate (THPP), lead tricinate, or the like may be adopted.

In actuation of the igniter 20, when an actuating current for igniting the ignition charge is supplied from the power source to the conduction pins, the bridge wire in the ignition portion 21 generates heat, and as a result, the ignition charge in the igniter cup is ignited and burns, generating a combustion gas. Then, the pressure in the igniter cup increases along with the combustion of the ignition charge in the igniter cup of the ignition portion 21, a rupture surface 21A of the igniter cup ruptures, and the combustion gas is discharged from the igniter cup into the accommodating space 13. More specifically, the combustion gas from the igniter cup is discharged into a recess 411 in a piston portion 41 described later of the projectile 40 disposed in the accommodating space 13.

Projectile

Next, the projectile 40 will be described. The projectile 40 is formed from an insulating member such as synthetic resin, for example, and includes the piston portion 41 and a rod portion 42 connected to the piston portion 41. The piston portion 41 has a substantially cylindrical shape and has an outer diameter substantially corresponding to an inner diameter of the large diameter cylinder portion 113 in the top holder 110. For example, the diameter of the piston portion 41 may be slightly smaller than the inner diameter of the large diameter cylinder portion 113. The shape of the projectile 40 can be changed as appropriate according to the shape of the housing 10 and the like.

Further, the recess 411 having a cylindrical shape, for example, is formed on an upper surface of the piston portion 41. This recess 411 receives the ignition portion 21. A bottom surface of the recess 411 is formed as a pressure receiving surface 411A that receives energy received from the igniter 20 during actuation of the igniter 20. Further, a constricted portion having an outer circumferential surface recessed as compared with other locations is annularly formed along a circumferential direction of the piston portion 41 at an axially intermediate portion of the piston portion 41. An O-ring 43 is fitted into this constricted portion. The O-ring 43 is formed from, for example, rubber (silicone rubber, for example) or a synthetic resin, and functions to increase airtightness between an inner circumferential surface in the large diameter cylinder portion 113 and the piston portion 41.

The rod portion 42 of the projectile 40 is a rod-shaped member having an outer circumferential surface smaller in diameter than the piston portion 41, for example, is integrally connected to a lower end side (arc-extinguishing region side) of the piston portion 41, and extends to the side of the cutoff portion of the conductor piece. A lower end surface of the rod portion 42 is formed as a cutoff surface 421 for cutting off the cutoff portion 53 from the conductor piece 50 during actuation of the breaker device 1. Note that although the rod portion 42 in the present embodiment has a substantially cylindrical tubular shape, the shape thereof is not particularly limited, and can be changed in accordance with the shape and size of the cutoff portion 53 to be cut off from the conductor piece 50 during actuation of the breaker device 1. The rod portion 42 may have a columnar shape such as a cylinder or a prism, for example. Note that, in an initial position of the projectile 40 illustrated in FIG. 1, a region on a tip end side including the cutoff surface 421 in the rod portion 42 of the projectile 40 is positioned in the cavity portion (forming a portion of the accommodating space 13) of the housing body 100. The diameter of the rod portion 42 is slightly smaller than the inner diameter of an inner circumferential surface of the housing body 100, for example, and the outer circumferential surface of the rod portion 42 is guided along the inner circumferential surface when the projectile 40 is projected.

As described in detail later, the projectile 40 configured as described above is projected from the initial position illustrated in FIG. 1 when the upper surface of the piston portion 41 including the pressure receiving surface 411A receives the energy from the igniter 20 during actuation of the igniter 20, and moves at high speed toward the second end portion 12 side (downward) along the accommodating space 13. Specifically, as illustrated in FIG. 1, the piston portion 41 of the projectile 40 is accommodated inside the large diameter cylinder portion 113 in the top holder 110, and is slidable in the axial direction along an inner wall surface of the large diameter cylinder portion 113. In the present embodiment, the piston portion 41 of the projectile 40 has a substantially cylindrical shape, but the shape thereof is not particularly limited. As the outer shape of the piston portion 41, an appropriate shape and size can be adopted in accordance with the shape and size of the inner wall surface of the large diameter cylinder portion 113.

Conductor Piece

Figure 2:
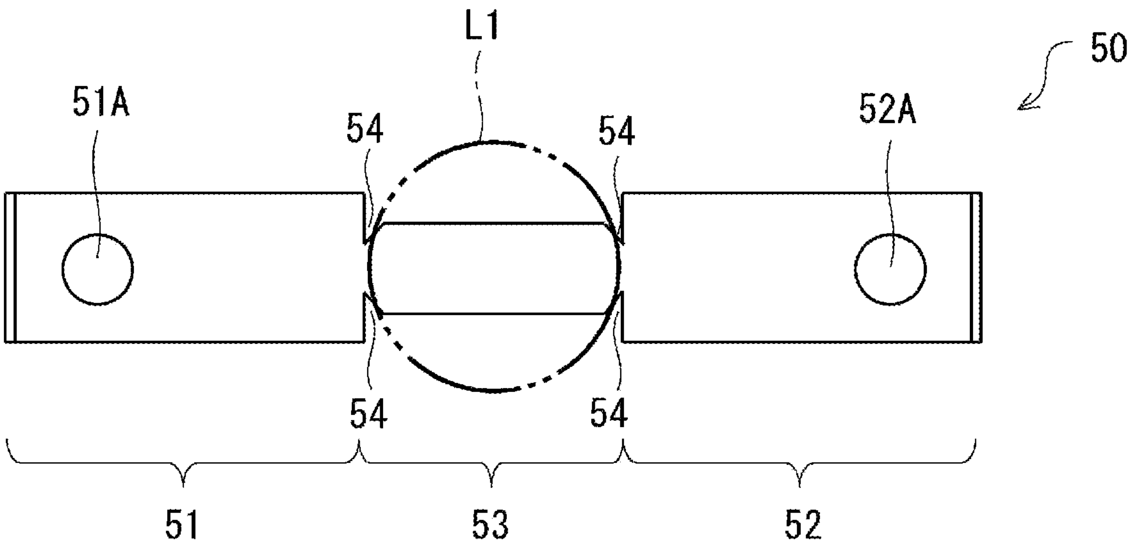
FIG. 2 is a top view of a conductor piece according to the embodiment.

Next, the conductor piece 50 will be described. FIG. 2 is a top view of the conductor piece 50 according to the embodiment. The conductor piece 50 is a metal body having conductivity that constitutes a portion of the components of the breaker device 1 and, when the breaker device 1 is attached to a predetermined electric circuit, forms a portion of the electric circuit, and may be referred to as a bus bar. The conductor piece 50 can be formed from a metal such as copper (Cu), for example. However, the conductor piece 50 may be formed from a metal other than copper, or may be formed from an alloy of copper and another metal. Note that examples of metals other than copper included in the conductor piece 50 include manganese (Mn), nickel (Ni), and platinum (Pt).

In one aspect illustrated in FIG. 2, the conductor piece 50 is formed as an elongated flat plate piece as a whole, and includes a first connecting end portion 51 and a second connecting end portion 52 on both end sides, and the cutoff portion 53 positioned in an intermediate portion therebetween. Connection holes 51A, 52A are provided in the first connecting end portion 51 and the second connecting end portion 52 of the conductor piece 50, respectively. These connection holes 51A, 52A are used to connect with other conductors (lead wires, for example) in the electric circuit. Note that in FIG. 1, the connection holes 51A and 52A in the conductor piece 50 are not illustrated. The cutoff portion 53 of the conductor piece 50 is a portion forcibly and physically cut by the rod portion 42 of the projectile 40 and is cut off from the first connecting end portion 51 and the second connecting end portion 52 when an abnormality such as excessive current occurs in the electric circuit to which the breaker device 1 is applied. Notches (slits) 54 are formed at both ends of the cutoff portion 53 of the conductor piece 50, making it easy to cut and cut off the cutoff portion 53.

Here, various forms of the conductor piece 50 can be adopted, and a shape thereof is not particularly limited. While, in the example illustrated in FIG. 2, surfaces of the first connecting end portion 51, the second connecting end portion 52, and the cutoff portion 53 form the same surface, the form is not limited thereto. For example, the conductor piece 50 may be connected such that the cutoff portion 53 is orthogonal to or inclined relative to the first connecting end portion 51 and the second connecting end portion 52. Further, the planar shape of the cutoff portion 53 of the conductor piece 50 is not particularly limited, either. Of course, the shapes of the first connecting end portion 51 and the second connecting end portion 52 of the conductor piece 50 are not particularly limited, either. Further, the notches 54 in the conductor piece 50 can be omitted as appropriate.

Here, a pair of conductor piece holding holes 105A and 105B are formed in the housing body 100 according to the embodiment. The pair of conductor piece holding holes 105A and 105B extend in a transverse cross-sectional direction orthogonal to the vertical direction (axial direction) of the housing body 100. More specifically, the pair of conductor piece holding holes 105A and 105B extend in a straight line with the cavity portion (accommodating space 13) of the housing body 100 interposed therebetween. The conductor piece 50 configured as described above is held in the housing body 100 in a state of being inserted through the pair of conductor piece holding holes 105A and 105B formed in the housing body 100. In the example illustrated in FIG. 1, the first connecting end portion 51 of the conductor piece 50 is held in a state of being inserted through the conductor piece holding hole 105A, and the second connecting end portion 52 is held in a state of being inserted through the conductor piece holding hole 105B. In this state, the cutoff portion 53 of the conductor piece 50 is positioned in the cavity portion (accommodating space 13) of the housing body 100. As described above, the conductor piece 50 attached to the housing body 100 is held orthogonally to the extending direction (axial direction) of the accommodating space 13 with the cutoff portion 53 crossing the accommodating space 13. Note that reference sign L1 illustrated in FIG. 2 denotes an outer circumferential position of the rod portion 42 positioned above the conductor piece 50 in a state of being attached to the housing body 100 of the breaker device 1. In the present embodiment, the conductor piece 50 is installed with the outer circumferential position L1 of the rod portion 42 substantially overlapping the positions of the notches 54 positioned at both ends of the cutoff portion 53. In the present embodiment, for example, since a transverse cross-sectional area of the accommodating space 13 is larger than a transverse cross-sectional area of the cutoff portion 53, a gap is formed on the side of the cutoff portion 53.

Coolant Material

Next, the coolant material 60 disposed in the accommodating space 13 in the housing 10 will be described. Here, as illustrated in FIG. 1, prior to actuation of the breaker device 1 (igniter 20), the cutoff portion 53 of the conductor piece 50 in a state of being held in the pair of conductor piece holding holes 105A and 105B in the housing body 100 is horizontally laid crossing the accommodating space 13 of the housing 10. Hereinafter, within the accommodating space 13 of the housing 10 separated by the cutoff portion 53 of the conductor piece 50, a region (space) in which the projectile 40 is disposed is referred to as a "projectile initial arrangement region R1", and a region (space) positioned on the opposite side of the projectile 40 is referred to as an "arc-extinguishing region R2". Note that as described above, since the gap is formed on the side of the cutoff portion 53 disposed crossing the accommodating space 13, the projectile initial arrangement region R1 and the arc-extinguishing region R2 are not completely isolated from each other by the cutoff portion 53, but communicate with each other. Of course, depending on the shape and size of the cutoff portion 53, the projectile initial arrangement region R1 and the arc-extinguishing region R2 may be completely isolated from each other by the cutoff portion 53.

The arc-extinguishing region R2 of the accommodating space 13 is a region (space) for receiving the cutoff portion 53 cut off by the rod portion 42 of the projectile 40 projected during actuation of the breaker device 1 (igniter 20). In this arc-extinguishing region R2, the coolant material 60 as an arc-extinguishing material is disposed. The coolant material 60 is a coolant material for removing thermal energy of the arc generated and the cutoff portion 53 when the projectile 40 cuts off the cutoff portion 53 of the conductor piece 50, and cools the arc and the cutoff portion 53, thereby suppressing arc generation during cutting off of a current or thereby extinguishing (eliminating) the generated arc.

The arc-extinguishing region R2 of the breaker device 1 has significance as a space for receiving the cutoff portion 53 cut off from the first connecting end portion 51 and the second connecting end portion 52 of the conductor piece 50 by the projectile 40 and, at the same time, as a space for effectively extinguishing the arc generated when the projectile 40 cuts off the cutoff portion 53. Then, in order to effectively extinguish the arc generated when the cutoff portion 53 is cut off from the conductor piece 50, the coolant material 60 is disposed as an arc-extinguishing material in the arc-extinguishing region R2.

As one aspect of the embodiment, the coolant material 60 is solid. As one aspect of the embodiment, the coolant material 60 is formed from a shape retaining body. The shape retaining body herein is, for example, a material that can keep a constant shape when no external force is applied and can hold the integrity (does not come apart), even if deformation can occur, when an external force is applied. For example, examples of the shape retaining body include a fibrous body formed into a desired shape. In the present embodiment, the coolant material 60 is formed from a metal fiber that is a shape retaining body. Here, examples of the metal fiber forming the coolant material 60 include an aspect in which at least any one of steel wool or copper wool is included. However, the above aspects in the coolant material 60 are examples, and the coolant material 60 is not limited to the above aspects.

The coolant material 60 is formed into a substantially disk shape, for example, and is disposed at a bottom portion of the bottom container 120.

Resin Material

Next, the resin material 70 will be described. The resin material 70 is disposed in the accommodating space 13 of the housing 10. The resin material 70 of the present embodiment is disposed in the arc-extinguishing region R2. When the igniter 20 is actuated, the resin material is modified by the heat of the arc generated and the cutoff portion 53 when the projectile 40 cuts off the cutoff portion 53 of the conductor piece 50. This modification consumes thermal energy, thereby contributing to extinguishing (eliminating) of the arc. As described above, similar to the coolant material 60, the resin material 70 functions as an arc-extinguishing material. Note that the resin material 70 is modified mainly by the heat of the arc, but other than this, the resin material 70 is also affected by the heat generated when the cutoff portion 53 is cut off and the heat such as combustion heat of the ignition charge. The heat received from ignition of the ignition charge to completion of arc-extinguishing is referred to as heat associated with actuation of the igniter 20.

The resin material 70 of the present embodiment is a synthetic resin including silicone. Note that the resin material is not limited to silicone, and may be a material using another resin such as polyurethane, polyethylene, polypropylene, polyamide, or nitrile rubber. The resin material 70 is only required to be a material at least a portion of which is modified by heat, and may be made of a composite material including glass, a ceramic filler, or the like.

The resin material 70 is formed in a ring shape or an arc shape, and is provided along an inner wall of the side wall portion 122 from an upper surface of the coolant material 60 to an upper end of the bottom container 120. The resin material 70 is not limited to a solid member formed in a predetermined shape, and may be a gel-like material or a highly viscous liquid material applied to a wall surface in the accommodating space 13 to be used as in FIG. 1. Further, the resin material 70 may be fixedly provided on the wall surface by applying a synthetic resin melted with an organic solvent such as toluene to the wall surface in the accommodating space 13 and then volatilizing the organic solvent.

Operation

Next, operation content when the breaker device 1 is actuated to interrupt the electric circuit will be described. As described above, FIG. 1 illustrates a state of the breaker device 1 prior to actuation (hereinafter also referred to as the "pre-actuation initial state"). In this pre-actuation initial state, in the projectile 40 in the breaker device 1, the piston portion 41 is positioned on the first end portion 11 side (upper end side) in the accommodating space 13, and the cutoff surface 421 formed at the lower end of the rod portion 42 is set at an initial position positioned on the upper surface of the cutoff portion 53 in the conductor piece 50.

Furthermore, the breaker device 1 according to the embodiment further includes an abnormality detection sensor (not illustrated) configured to detect an abnormal state of a device (such as a vehicle, a power generation facility, or a power storage facility) to which an electric circuit to be cut off is connected, and a control unit (not illustrated) configured to control the actuation of the igniter 20. In addition to the current flowing through the conductor piece 50, the abnormality detection sensor may be capable of detecting an abnormal state on the basis of a voltage or a temperature of the conductor piece 50. Further, the abnormality detection sensor may be, for example, an impact sensor, a temperature sensor, an acceleration sensor, a vibration sensor, or the like, and may detect an abnormal state such as an accident or fire on the basis of an impact, a temperature, acceleration, or vibration in a device such as a vehicle. The control unit of the breaker device 1 is a computer capable of performing a predetermined function by executing a predetermined control program, for example. The predetermined function of the control unit may be realized by corresponding hardware. Then, when excessive current flows through the conductor piece 50 forming a portion of the electric circuit to which the breaker device 1 is applied, the abnormal current is detected by the abnormality detection sensor. Abnormality information regarding the detected abnormal current is passed from the abnormality detection sensor to the control unit. For example, the control unit is energized from an external power source (not illustrated) connected to the conduction pin of the igniter 20 and actuates the igniter 20 based on the current value detected by the abnormality detection sensor. Here, the abnormal current may be a current value that exceeds a predetermined threshold value set for protection of a predetermined electric circuit. Note that the abnormality detection sensor and the control unit described above need not be included in the components of the breaker device 1, and may be included in a device separate from the breaker device 1, for example. Further, the abnormality detection sensor and the control unit are not essential components of the breaker device 1.

For example, when an abnormal current of the electric circuit is detected by an abnormality detection sensor that detects an abnormal current of the electric circuit, the control unit of the breaker device 1 actuates the igniter 20. That is, an actuating current is supplied from the external power source (not illustrated) to the conduction pin of the igniter 20, and as a result, the ignition charge in the ignition portion 21 is ignited and burns, generating a combustion gas. Then, the rupture surface 21A ruptures due to rise in pressure in the ignition portion 21, and the combustion gas of the ignition charge is discharged from the inside of the ignition portion 21 into the accommodating space 13.

Here, the ignition portion 21 of the igniter 20 is received in the recess 411 of the piston portion 41, and the rupture surface 21A of the ignition portion 21 is disposed facing the pressure receiving surface 411A of the recess 411 in the projectile 40. Therefore, the combustion gas from the ignition portion 21 is discharged to the recess 411, and the pressure (combustion energy) of the combustion gas is transmitted to the upper surface of the piston portion 41 including the pressure receiving surface 411A. As a result, the projectile 40 moves downward in the accommodating space 13 in the extending direction (axial direction) of the accommodating space 13.

Figure 3A:
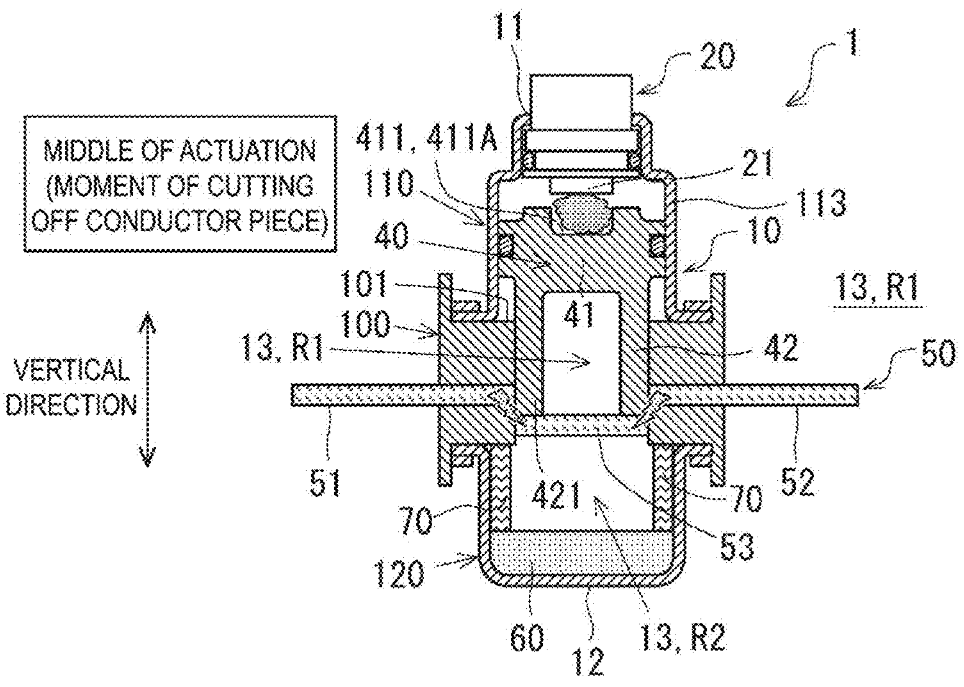
FIGS. 3A and 3B are views illustrating actuation situations of the breaker device according to the embodiment.
Figure 3B:
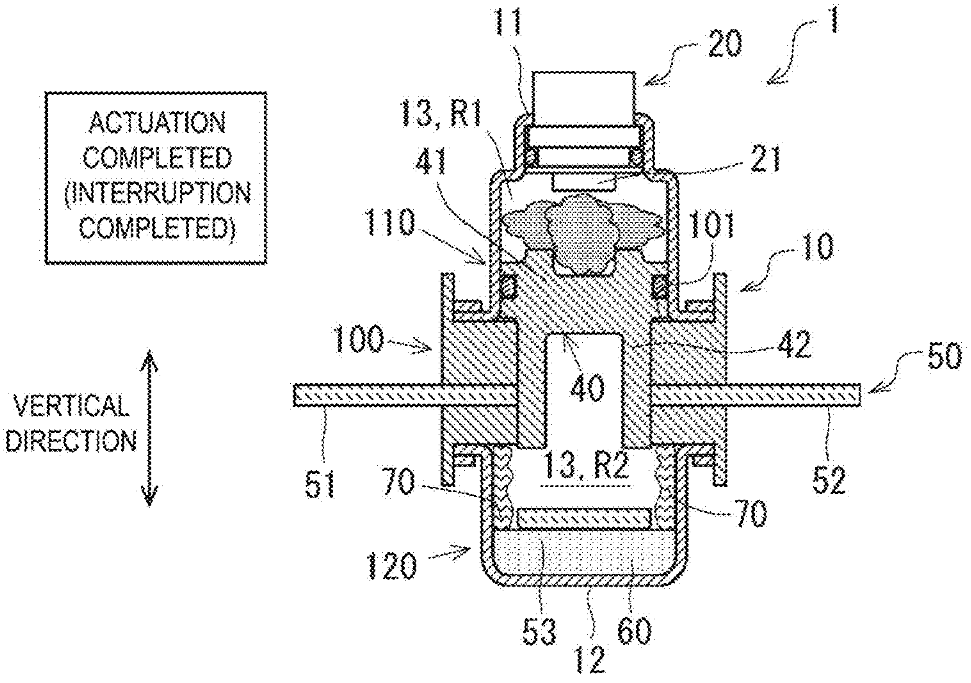

FIGS. 3A and 3B are views illustrating actuation situations of the breaker device 1 according to the embodiment. FIG. 3A illustrates a situation in the middle of actuation of the breaker device 1, and FIG. 3B illustrates a situation in which the actuation of the breaker device 1 is completed. As described above, upon actuation of the igniter 20, the projectile 40 having received the pressure (combustion energy) of the combustion gas of the ignition charge is vigorously pushed downward. As a result, the cutoff surface 421 formed on the lower end side of the rod portion 42 pressingly cuts, by shearing, the boundary portions between the first connecting end portion 51 and the cutoff portion 53 and between the second connecting end portion 52 and the cutoff portion 53 in the conductor piece 50. As a result, the cutoff portion 53 is cut off from the conductor piece 50. Note that as long as the projectile 40 can be moved smoothly in the extending direction (axial direction) of the accommodating space 13 when the igniter 20 is actuated, the shape and the dimensions of the projectile 40 can be freely determined, and the outer diameter of the piston portion 41 of the projectile 40 may be set to a dimension equal to the inner diameter of the large diameter cylinder portion 113 in the top holder 110, for example.

Then, as illustrated in FIG. 3B, the projectile 40 moves downward in the extending direction (axial direction) of the accommodating space 13 by a predetermined stroke until the lower end surface of the piston portion 41 abuts (collides with) the upper surface 101 of the housing body 100. Then, in this state, the cutoff portion 53, which has been cut off from the conductor piece 50 by the rod portion 42 of the projectile 40, is received in the arc-extinguishing region R2 where the coolant material 60 and the resin material 70 are disposed. As a result, the first connecting end portion 51 and the second connecting end portion 52 positioned on both ends of the conductor piece 50 are electrically disconnected, and the predetermined electric circuit to which the breaker device 1 is applied is forcibly interrupted.

In the breaker device 1 of the embodiment, the coolant material 60 is disposed in the arc-extinguishing region R2. Therefore, the cutoff portion 53 after being cut off that has been received in the arc-extinguishing region R2 can be rapidly cooled by the coolant material 60. Thus, when the cutoff portion 53 is cut off from the conductor piece 50 constituting a portion of the predetermined electric circuit by the projectile 40, even in a case where an arc is generated at the cut surface of the cutoff portion 53 of the conductor piece 50, the generated arc can be quickly and effectively extinguished.

Furthermore, in the breaker device 1, the resin material 70 as an arc-extinguishing material is disposed between the coolant material 60 and the cutoff portion 53 in the arc-extinguishing region R2. Thus, immediately after the rod portion 42 cuts off the cutoff portion 53 from the conductor piece 50, that is, when an arc is generated by the cutting off, the resin material 70 is modified by the heat of this arc, and this modification consumes the heat of the arc, whereby the arc can be quickly and effectively extinguished. The resin material 70 is made of a material that is easily modified, such as being decomposed or volatilized, by heat as compared with other resin materials such as the housing 10 and the projectile 40, and this modification can effectively consume the heat of the arc. Further, in the resin material 70 of the present embodiment, a component such as silica generated by thermal decomposition exhibits a high resistance value, and as this component scatters, the resin material 70 contributes to improving the insulation property after cutting.

As described above, according to the breaker device 1 of the present embodiment, the cutoff portion 53 is cooled by the coolant material 60 and the resin material 70, and arc generation can be effectively suppressed. As a result, it is possible to quickly interrupt the electric circuit to which the breaker device 1 is applied in a case where an abnormality is detected in the electric circuit, or the like. That is, by effectively suppressing delay in extinguishing of the arc generated when the electric circuit is interrupted, it is possible to suppress delay in interruption of the electric circuit. Further, effectively cooling the heat of the arc by the coolant material 60 and the resin material 70 can suppress evaporation of the conductor piece 50 that has been cut off, and achieve a sufficiently high insulation resistance value after cutting. Furthermore, according to the breaker device 1, it is possible to suitably suppress the generation of a large spark or flame or the generation of a loud impact sound when the electric circuit is interrupted. Further, damage to the housing 10 and the like of the breaker device 1 caused by these can also be suppressed.

Modification 1

Figure 4:
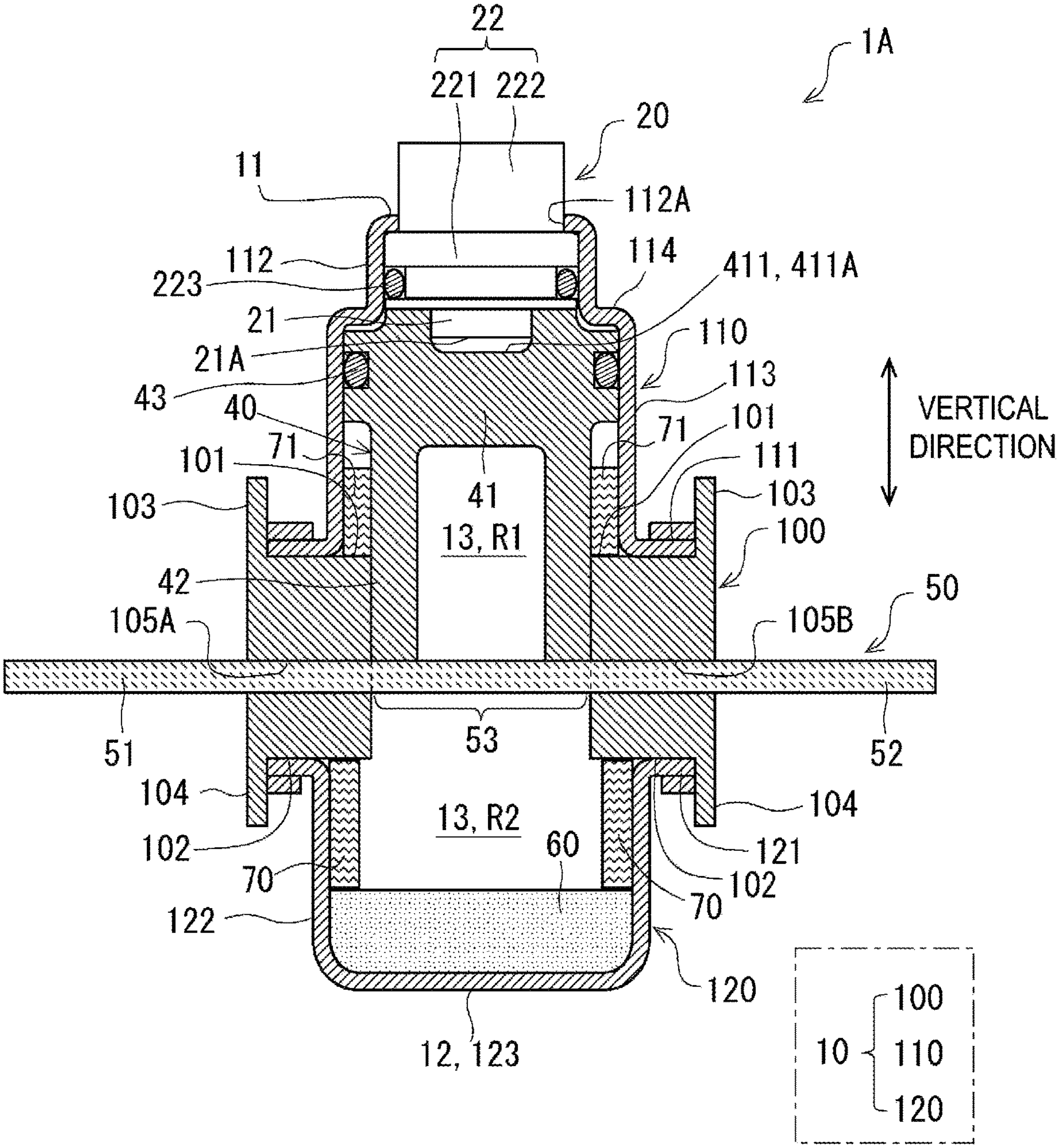
FIG. 4 is a view illustrating an internal structure of a breaker device according to a modification 1.

For the breaker device 1 according to the embodiment, various modifications can be adopted. For example, the shape, position, range, and the like of the coolant material 60 disposed in the arc-extinguishing region R2 of the accommodating space 13 can be changed as appropriate. For example, FIG. 4 is a view illustrating an internal structure of a breaker device 1A according to a modification 1. The breaker device 1A of the present modification 1 has a configuration in which a resin material 71 is disposed in the projectile initial arrangement region R1 in addition to the configuration of the breaker device 1 illustrated in FIG. 1. Note that since the other configurations are the same, the description thereof will be omitted.

The resin material 71 is disposed between the piston portion 41 and the cutoff portion 53, and between an inner wall of the top holder 110 and the rod portion 42 prior to actuation of the igniter 20. Thus, when the projectile 40 is projected upon actuation of the igniter 20, a portion of the resin material 71 on the rod portion 42 side moves to the cutoff portion 53 side together with the rod portion 42 due to friction with the rod portion 42, and is further crushed by the piston portion 41 and moves to the cutoff portion 53 side. Then, when the rod portion 42 cuts off the cutoff portion 53 and an arc is generated, the resin material 71 is modified by the heat of the arc, thereby removing the heat of the arc to cool the arc.

Accordingly, as illustrated in FIG. 3A, the cutoff portion 53 can be cooled by the resin material 71 even at the moment when the cutoff portion 53 is cut off from the conductor piece 50 by the cutoff surface 421 of the rod portion 42 and immediately thereafter, that is, in a transient state from the moment when the cutoff portion 53 is cut off from the conductor piece 50 to when the cutoff portion 53 comes into contact with the coolant material 60 disposed in the arc-extinguishing region R2. This makes it possible to suitably suppress the generation of an arc at the cut surface of the cutoff portion 53 in the transient state at the moment when the cutoff portion 53 is cut off from the conductor piece 50 and immediately thereafter.

Modification 2

Figure 5:
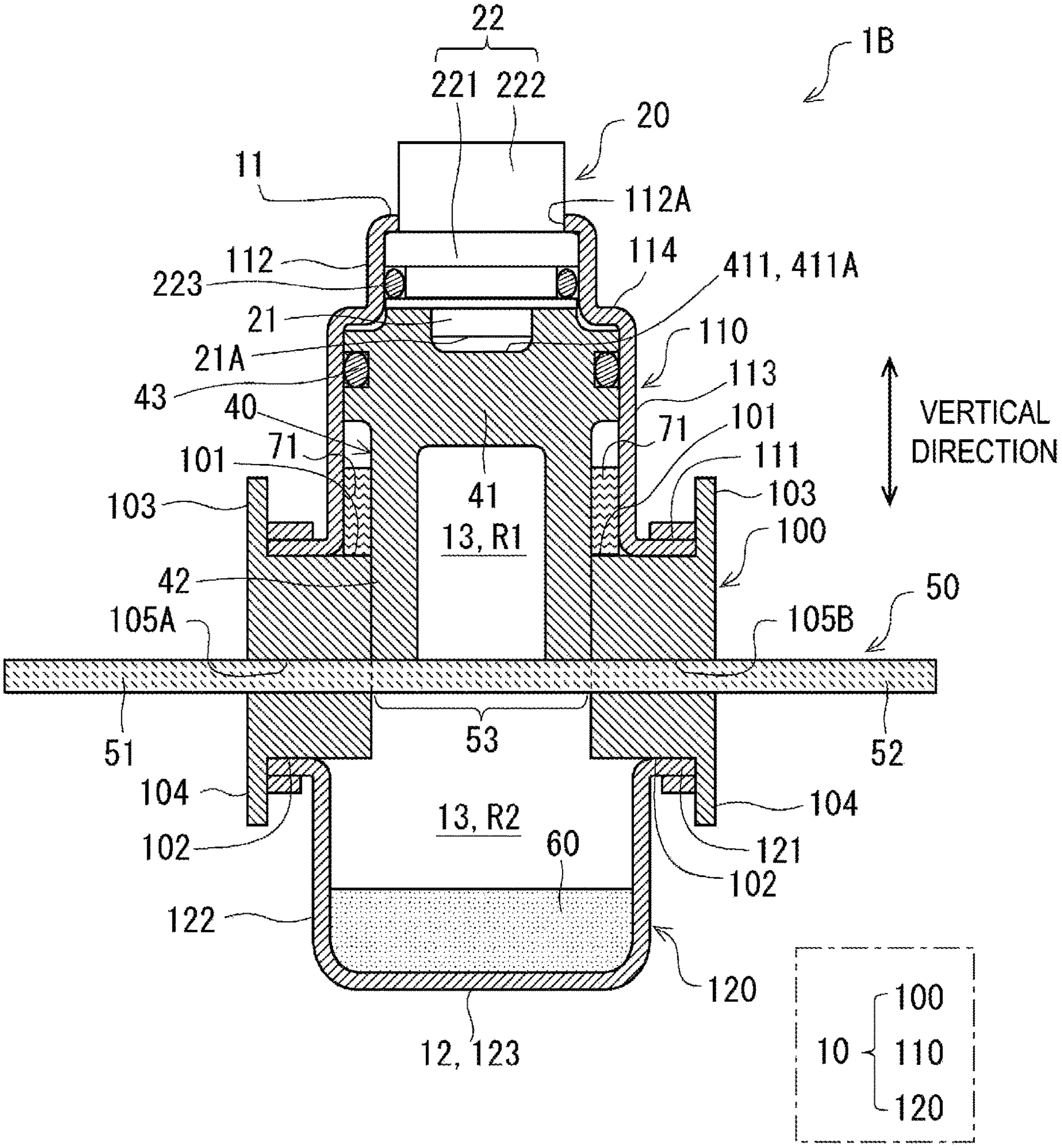
FIG. 5 is a view illustrating an internal structure of a breaker device according to a modification 2.

FIG. 5 is a view illustrating an internal structure of a breaker device 1B according to a modification 2. The breaker device 1B of the present modification 2 has a configuration in which the resin material 70 is removed from the configuration of the breaker device 1A illustrated in FIG. 4. Note that since the other configurations are the same, the description thereof will be omitted. Even with the configuration in which the resin material 70 is removed as described above, since the resin material 71 cools the cutoff portion 53, arc generation can be suppressed.

Modification 3

Figure 6:
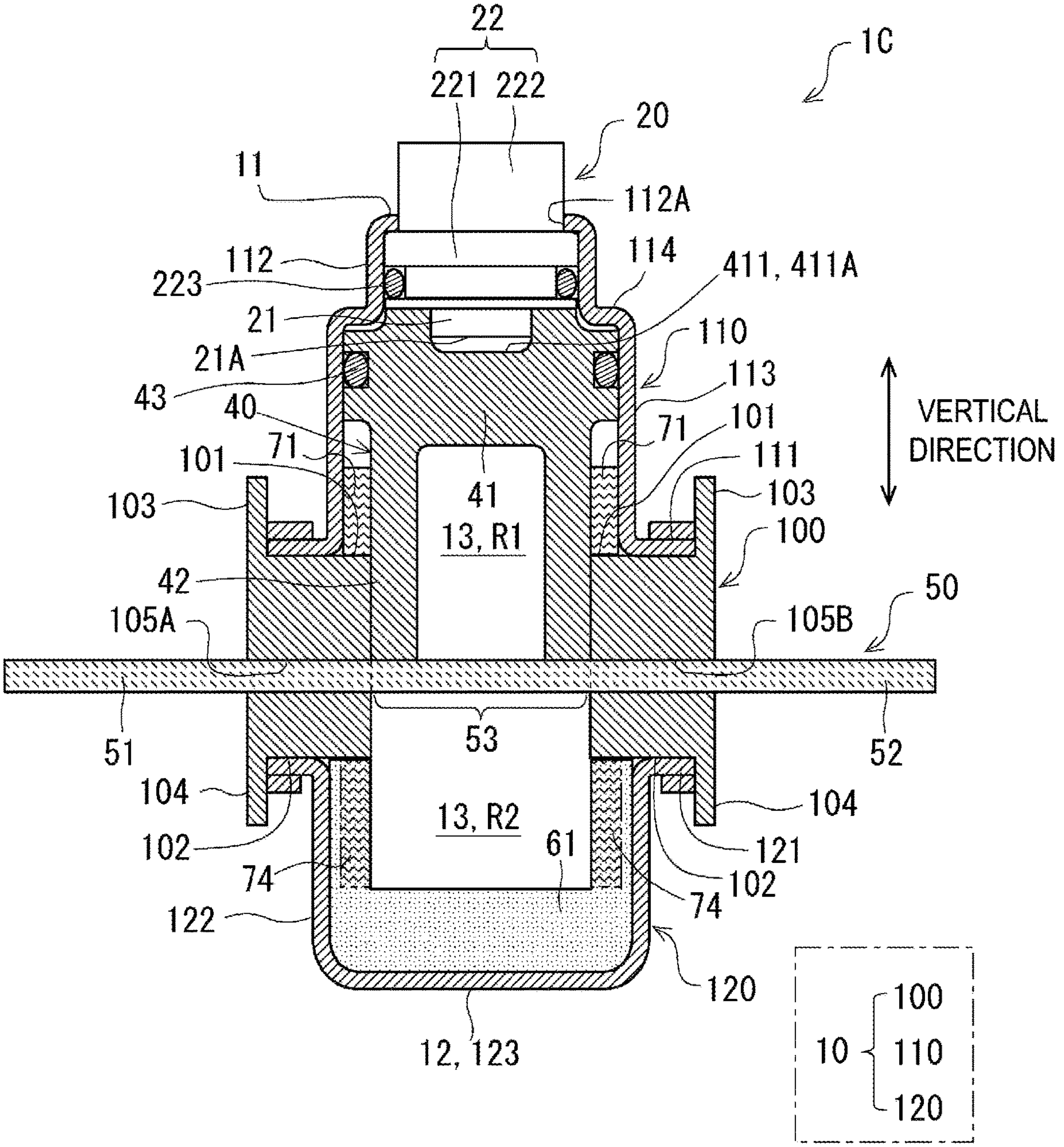
FIG. 6 is a view illustrating an internal structure of a breaker device according to a modification 3.
Figure 7:
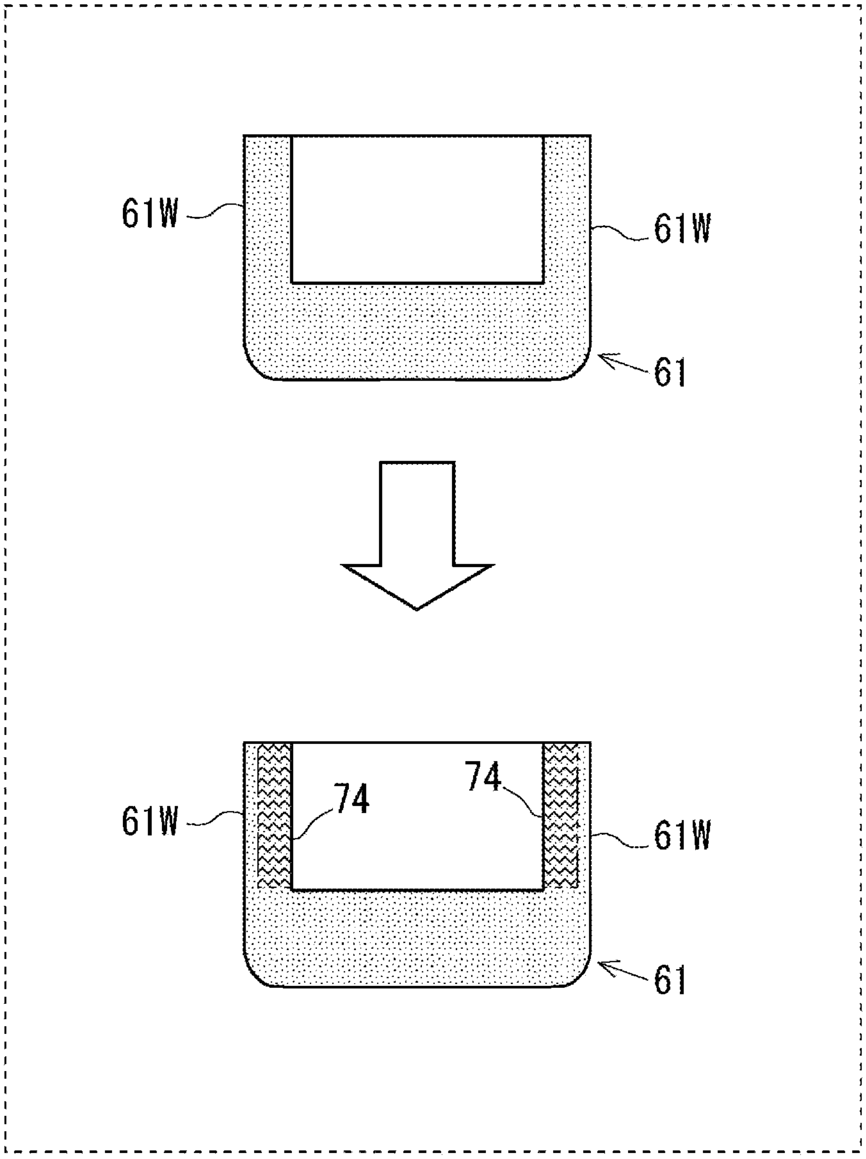
FIG. 7 is an explanatory view of a coolant material and a resin material according to the modification 3.

FIG. 6 is a view illustrating an internal structure of a breaker device 1C according to a modification 3. FIG. 7 is an explanatory view of a coolant material 61 and a resin material 74 according to the modification 3. The breaker device IC of the present modification 3 has a configuration in which the resin material in the arc-extinguishing region R2 is impregnated in the coolant material 61 as compared with the configuration of the breaker device 1A illustrated in FIG. 4. Note that since the other configurations are the same, the description thereof will be omitted.

In the present modification 3, the coolant material 61 provided in the arc-extinguishing region R2 is formed in a bowl shape along an inner wall of the bottom container 120 using a metal fiber such as steel wool. The upper half of FIG. 7 schematically illustrates a cross section of the coolant material 61 formed from a metal fiber. Then, using a resin material that is liquid in an initial state and is solidified upon reaction with air, heat, ultraviolet rays, or the like, the resin material in a liquid state is impregnated in a circumferential wall 61W of the coolant material 61 and is then solidified, thereby forming the resin material 74 in the circumferential wall 61W portion of the coolant material 61 as illustrated in the lower half of FIG. 7. Even with the configuration in which the resin material 74 is provided impregnated in the coolant material 61 as described above, the cutoff portion 53 after being cut off is cooled by the resin material 74, whereby the arc can be quickly and effectively extinguished. Note that solidification of the resin material 74 is not essential as long as the resin material has viscosity even in a liquid state, for example, and is held at a predetermined position in a state of being impregnated in the coolant material 61.

Electric Circuit Interruption Test

Figure 8:
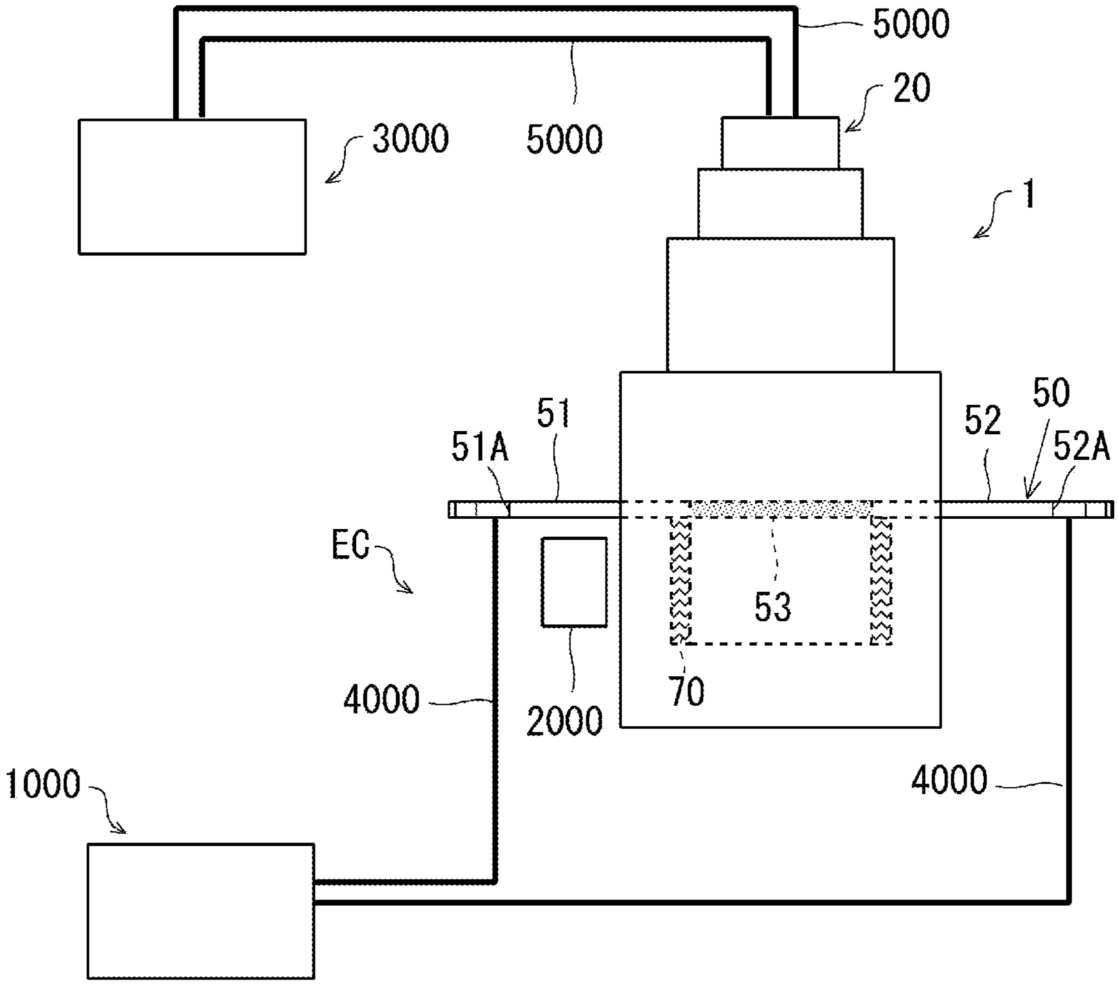
FIG. 8 is a view schematically illustrating a testing device used in an electric circuit interruption test.

Next, an electric circuit interruption test performed on the breaker devices 1 and 1A will be described. FIG. 8 is a view schematically illustrating a testing device used in the electric circuit interruption test. Reference sign 1000 denotes a power source, reference sign 2000 denotes an insulation resistance meter, and reference sign 3000 denotes an actuation power source. Further, reference sign 4000 denotes wiring for forming an electric circuit EC in cooperation with the conductor piece 50 of the breaker device 1. Further, reference sign 5000 denotes wiring for causing an actuation current supplied from the actuation power source 3000 to flow to the conduction pin of the igniter 20 of the breaker device 1.

TABLE 1

| Sample No. | Test conditions | Thickness of resin material 70 | Presence or absence of resin material 71 | Resistance value |
|---|---|---|---|---|
| 1 | 900 V | 4 mm | Absent | 34 MΩ |
| 2 | 12 kA | | Absent | 37 MΩ |
| 3 | 12 μH | | Present | 550 MΩ or more |
| 4 | | | Present | 550 MΩ or more |

Table 1 shows a list of conditions and results of the electric circuit interruption test. The test sample Nos. 1 and 2 in the table were tested for the breaker device 1 not including the resin material 71 in the projectile initial arrangement region R1 as illustrated in FIG. 1. On the other hand, the test sample Nos. 3 and 4 were tested for the breaker device 1A provided with the resin material 71 in the projectile initial arrangement region R1 as illustrated in FIG. 4.

Next, the steps of the electric circuit interruption test will be described.

(Step 1) As illustrated in FIG. 8, the first connecting end portion 51 and the second connecting end portion 52 of the conductor piece 50 of the breaker device 1 are respectively connected to the power source 1000 by the wiring 4000, and the igniter 20 of the breaker device 1 is connected to the actuation power source 3000 by the wiring 5000.

(Step 2) The current from the power source 1000 is caused to flow to the electric circuit EC.

(Step 3) The actuation power source 3000 is turned on and the actuation current is applied to the igniter 20 of the breaker device 1, thereby actuating the igniter 20.

(Step 4) The power source 1000 and the actuation power source 3000 are turned off.

In the present interruption test, each test sample was tested according to the above steps, and an insulation resistance value between the first connecting end portion 51 and the second connecting end portion 52 when the cutoff portion 53 was cut off from the conductor piece 50 by the projectile 40 was measured by a commercially available insulation resistance meter 2000 (MY40 manufactured by Yokogawa Electric Corporation). Note that as conditions common to all the tests, the value of the current flowing through the electric circuit EC by the power source 1000 was set to 12 [kA], and a potential difference generated between the first connecting end portion 51 and the second connecting end portion 52 of the conductor piece 50 after the cutoff portion 53 was cut off in each interruption test was set to 900 [V].

As is clear from Table 1, both the breaker devices 1 and 1A including the resin material 70 had a result in which the insulation resistance value between the first connecting end portion 51 and the second connecting end portion 52 became sufficiently high. Further, as compared with the test sample Nos. 1 and 2, in which the test was performed without the resin material 71 being disposed in the projectile initial arrangement region R1, the test sample Nos. 3 and 4, in which the resin material 71 was disposed in the projectile initial arrangement region R1, resulted in even higher insulation resistance values between the first connecting end portion 51 and the second connecting end portion 52.

Second Embodiment

Figure 9:
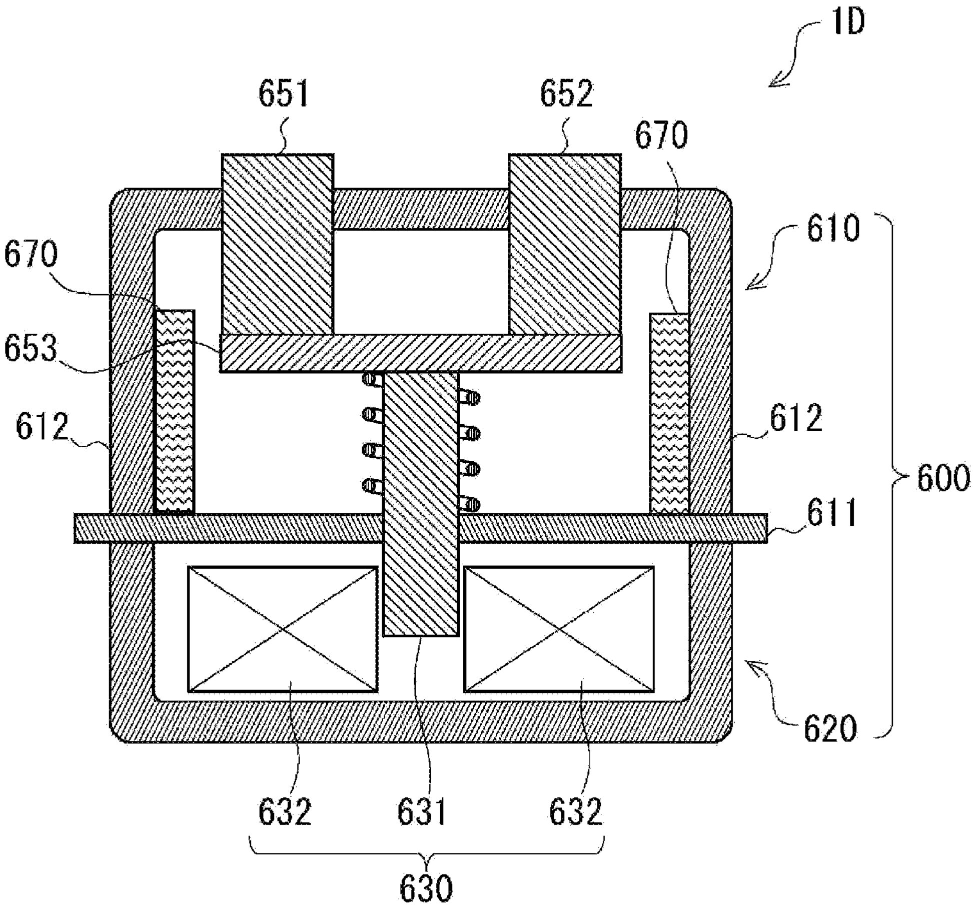
FIG. 9 is a view illustrating an internal structure of a breaker device according to a second embodiment.
Figure 10:
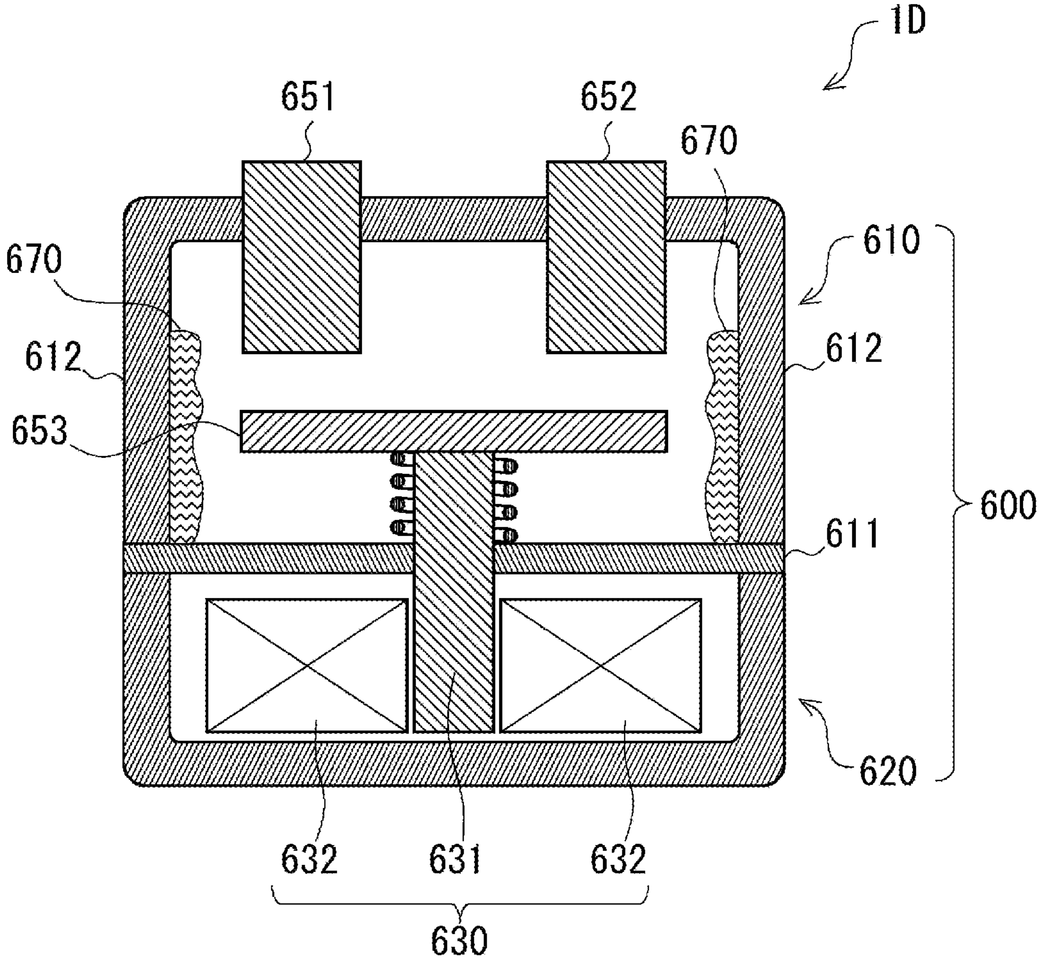
FIG. 10 is a view illustrating a state after actuation of the breaker device according to the second embodiment.

FIG. 9 is a view illustrating an internal structure of a breaker device 1D according to a second embodiment. The breaker device 1D is a device configured to interrupt an electric circuit included in a vehicle, an electric home appliance, a photovoltaic system, or the like when an abnormality occurs in the electric circuit or in a system including a lithium battery (lithium ion battery, for example) of the electric circuit, thereby preventing great damage. In the present specification, a cross section in the height direction illustrated in FIG. 9 (direction in which the accommodating space 13 described later extends) is referred to as a vertical cross section of the breaker device 1D, and a cross section in a direction orthogonal to the vertical cross section is referred to as a transverse cross section of the breaker device 1D. FIG. 9 illustrates a state prior to actuation of the breaker device 1D. FIG. 10 is a view illustrating a state after actuation of the breaker device 1D according to the present embodiment.

The breaker device ID includes a housing 600 as an outer shell member, an actuator 630, fixed contact points 651 and 652, a movable contact point 653, and a resin material 670. The housing 600 is substantially a rectangular parallelepiped, is divided into an upper housing 610 and a lower housing 620. The housing 600 includes a partition plate portion 611 between the upper housing 610 and the lower housing 620.

The actuator 630 is provided in the lower housing 620. The actuator 630 includes a movable shaft 631 and a drive coil 632 that vertically drives the movable shaft 631. The movable shaft 631 is provided extending through the partition plate portion 611, and a tip end thereof is positioned in an internal space 613 in the upper housing 610. The movable contact point 653 is provided at an upper end of the movable shaft 631. The movable contact point 653 is vertically driven by the actuator 630 together with the movable shaft 631.

One end of each of the fixed contact points 651 and 652 is provided in the upper housing 610, and the other end of each of the fixed contact points 651 and 652 is disposed outside the upper housing 610 and connected to another electric circuit. The breaker device 1D is normally in a state where the movable contact point 653 connects the fixed contact points 651 and 652 to each other as illustrated in FIG. 9. When the actuator 630 receives a cutting signal at the time of abnormality of an external system, the movable shaft 631 is lowered to separate the movable contact point 653 from the fixed contact points 651 and 652, thereby interrupting the electric circuit connected to the fixed contact points 651 and 652.

The resin material 670 is provided along a circumferential wall 612 in the upper housing 610. The resin material 670 is formed in a ring shape surrounding the fixed contact points 651 and 652 and the movable contact point 653.

When the movable contact point 653 is separated from the fixed contact points 651 and 652 by driving of the actuator 630, an arc is generated between the fixed contact points 651 and 652 and the movable contact point 653. In the present embodiment, since the resin material 670 is disposed surrounding the fixed contact points 651 and 652 and the movable contact point 653, the resin material 670 is modified by the heat of the arc, and this modification removes thermal energy, thereby swiftly extinguishing (eliminating) the arc. As described above, the resin material 670 functions as an arc-extinguishing material. Note that the composition and the like of the resin material 670 are the same as those of the resin material 70 described earlier.

As described above, according to the present embodiment, when the electric circuit is interrupted, the arc generated between the fixed contact points 651 and 652 and the movable contact point 653 is cooled by modification of the resin material 670, whereby the arc can be quickly and effectively extinguished.

While the embodiment of the electric circuit breaker device according to the present disclosure has been described above, each of the aspects disclosed in the present specification can be combined with any other feature disclosed in the present specification.

REFERENCE SIGNS LIST

1 Breaker device
10 Housing
13 Accommodating space
20 Igniter
40 Projectile
50 Conductor piece
53 Cutoff portion
60 Coolant material
70 Resin material

The invention claimed is:

1. An electric circuit breaker device comprising:
an igniter provided to a housing;
a projectile disposed in an accommodating space, the accommodating space being formed in the housing and extending in one direction, the projectile being configured to be projected along the accommodating space by energy received from the igniter;
a conductor piece that is provided to the housing, forms a portion of an electric circuit, includes in a portion thereof a cutoff portion to be cut off by the projectile that moves by the energy received from the igniter, and is disposed with the cutoff portion crossing the accommodating space;
a coolant material that removes thermal energy of an arc generated at the cutoff portion, the coolant material being disposed in a container defining an arc-extinguishing region, the arc-extinguishing region being positioned within the accommodating space, on a side opposite to the projectile prior to actuation of the igniter with the cutoff portion interposed between the arc-extinguishing region and the projectile, and configured to receive the cutoff portion cut off by the projectile; and
a resin material that is disposed extending along an inner wall of the housing and configured to be modified by heat associated with actuation of the igniter.

2. The electric circuit breaker device according to claim 1, wherein the resin material is disposed between the cutoff portion and the coolant material.

3. The electric circuit breaker device according to claim 1, wherein
the projectile includes a piston portion configured to receive energy from actuation of the igniter and move along the accommodating space, and the resin material is disposed on an arc-extinguishing region side of the piston portion prior to actuation of the igniter.

4. The electric circuit breaker device according to claim 3, wherein the projectile includes a rod portion extending from a surface on the arc-extinguishing region side of the piston portion to a side of the cutoff portion of the conductor piece, and the resin material is disposed between the piston portion and the cutoff portion, and between the inner wall and the rod portion prior to actuation of the igniter.

5. The electric circuit breaker device according to claim 1, wherein the resin material is formed in a ring shape or an arc shape along the inner wall surface of the housing.

6. The electric circuit breaker device according to claim 1, wherein the coolant material is formed from metal fibers, and the resin material is impregnated between the metal fibers forming the coolant material.

7. The electric circuit breaker device according to claim 1, wherein the resin material is a synthetic resin including silicone.

* * * * *